Jan. 13, 1925.
H. E. THOMPSON
1,523,314
NATURAL GAS GASOLINE
Original Filed May 31, 1923
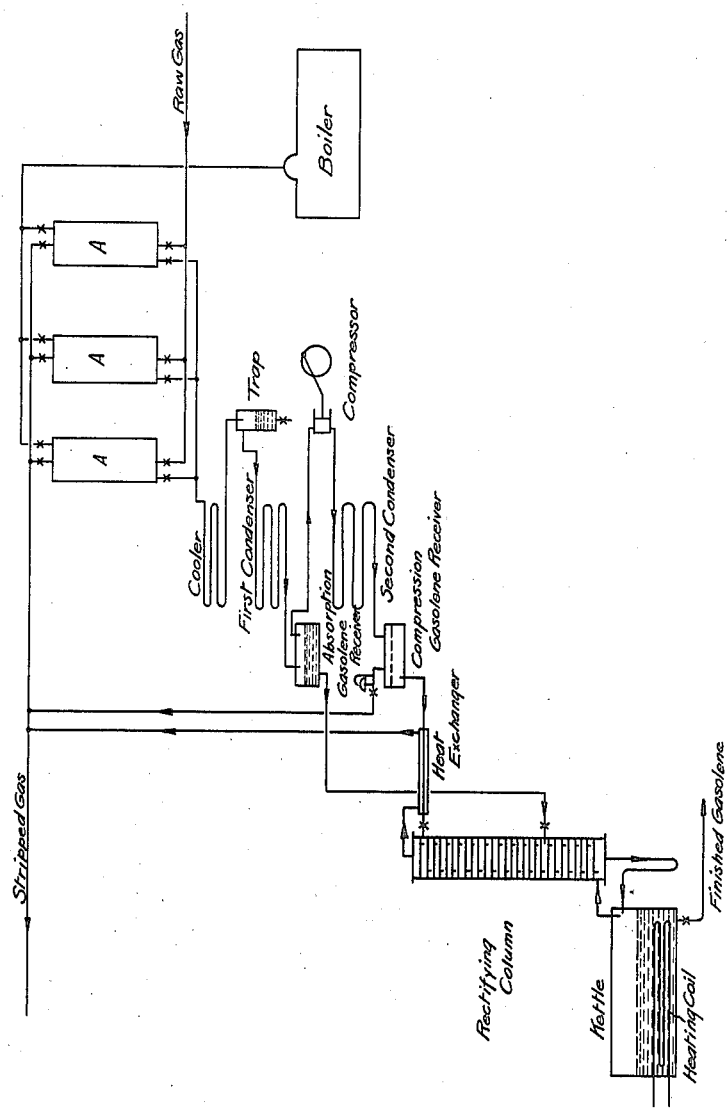

Patented Jan. 13, 1925.

1,523,314

UNITED STATES PATENT OFFICE.

HAROLD E. THOMPSON, OF CLENDENIN, WEST VIRGINIA, ASSIGNOR TO CARBIDE AND CARBON CHEMICALS CORPORATION, A CORPORATION OF NEW YORK.

NATURAL-GAS GASOLINE.

Original application filed May 31, 1923, Serial No. 642,624. Divided and this application filed May 10, 1924. Serial No. 712,348.

*To all whom it may concern:*

Be it known that I, HAROLD E. THOMPSON, a citizen of the United States, residing at Clendenin, in the county of Kanawha and State of West Virginia, have invented certain new and useful Improvements in Natural-Gas Gasoline, of which the following is a specification.

The invention is a gasoline of novel chemical composition and physical characteristics. Such gasoline may be advantageously produced by the process described and claimed in my copending application Serial No. 642,624 filed May 31, 1923, of which this application is a division. For a complete understanding of the subject matter claimed herein, the process referred to will now be described.

In Patent 1,429,175, issued to me on Sept. 12, 1922, I have described and claimed certain procedure for reducing the vapor pressure of "wild" gasoline to such a value that a transportable and marketable liquid results, such reduction of vapor pressure being effected by the selective removal of those constituents of the wild mixture which have the strongest tendency to increase vapor pressure, whereby the requisite reduction of vapor pressure is obtained with the withdrawal of a minimum quantity of material, and the stable salable residue, the gasoline, is produced in maximum quantity. In the patent, I have referred particularly to the stabilization of the wild product resulting from the well-known compression and oil absorption gasoline processes.

There is another natural gas gasoline process which has advantages that are now gaining general recognition, viz., the solid-absorbent process, in which the gas is brought into contact with an active solid absorbent, such as activated carbon, to remove its gasoline constituents, the latter being then recovered from the solid absorbent by steaming or other treatment adapted to cause the absorbed material to be liberated.

The solid-absorbent process as now usually practised gives, like the older processes, an initial product which is much too wild to be marketed, and an additional treatment is required to stabilize this product. When the stabilizing process consists of "weathering" as practised prior to my invention, then the advantages of the solid-absorbent process cannot be fully realized. Absorbents such as activated carbon absorb gasoline constituents with such avidity that it is possible to remove substantially all of the gasoline constituents, including butane, from the gas, but here again prior weathering processes impose a serious limitation, and the increased yield which would be expected to result from the use of a highly active absorbent is not fully attained. This is because with an increased absorption of gasoline constituents, there is also an increased absorption of more volatile substances, which go into the wild product and increase its vapor pressure excessively. The weathering treatment required to reduce the vapor pressure sufficiently must then be very drastic, with the result that much of the true gasoline constituents are vaporized along with the undesired substances and lost. The inherent advantage of an unusually active absorbent is thus in a measure nullified.

Application Serial No. 642,624 covers a species of my invention which differs from the embodiment specifically claimed in my patent referred to, in that it describes and claims a process wherein wild gasoline is produced from gas by the use of an active solid absorbent, and this product is stabilized by application of the principles set out in the patent. The modified process will now be explained in connection with the accompanying diagrammatic drawing.

In the drawing, the natural gas, by means of suitable piping and valves, is brought into contact with solid absorbent in one or more of the absorbers A. The stripped gas passes off from the absorber to the place of use.

When the material in an absorber has reached the desired degree of saturation, it is cut out of the gas current and its absorbed material is expelled, as by passing in steam (which may be superheated) from a boiler or by any suitable method. The expelled material together with the steam, if used, pass at a pressure slightly above barometric to a cooler where they are sufficiently cooled to condense most of the contained moisture without, however, liquefying any considerable proportion of the gasoline constituents. A suitable temperature for this purpose is about 175° F. The water separating in the cooler is removed by an appropriate trap and the gas still under slight pressure is passed to a first condenser where its temperature is further reduced, say to about 70° F. This latter cooling results in the condensation of a portion of the contained hydrocarbon material which collects in the receiver, marked "Absorption gasoline receiver" on the drawing, as a relatively quiet and non-volatile condensate.

The portion of the hydrocarbon material which is not liquefied in the first condenser is compressed to about 100 pounds per square inch, the compressed gas being again cooled to the temperature of cooling water in the second condenser, whereupon a further portion of hydrocarbon material is liquefied and collected in the receiver marked "Compression gasoline receiver" on the drawing. This latter condensate, being formed at a pressure of several atmospheres, will of course be more volatile or wild than the "absorption gasoline."

A portion of the hydrocarbon material will remain uncondensed even at a pressure of 100 pounds per square inch and at the temperature of cooling water, and this material will escape through a pressure regulator set to hold the desired pressure in the compression gasoline receiver and may then be mixed with the stripped gas or utilized for any other purpose. The two liquid hydrocarbon fractions are then treated in a single rectifying column in accordance with the principles set forth in my patent referred to above.

The absorption gasoline being relatively non-volatile, requires but little rectification and is therefore introduced into the rectifying column at a point considerably removed from its top. The more volatile compression gasoline is introduced into the rectifying column at a higher point in order that it may be subjected to a more thorough rectification as it descends in the column.

The requisite cooling of the top of the column is secured by the absorption of heat which takes place upon expanding the compression gasoline into the column, the pressure change being for example from 100 pounds per square inch to a pressure only slightly above barometric pressure.

The volatile hydrocarbons leaving the rectifying column as vapors, and comprising for example those constituents of natural gas which are more volatile than butane, will pass through a heat-exchanger wherein they serve to cool the incoming compression gasoline, and are then discharged into the stripped gas line or other place of use.

Except as noted, the operation of the rectifying column is identical with that disclosed in my patent referred to above, the vapor tension of the finished gasoline being readily adjusted by the rate at which heat is supplied to the heating coil of the kettle of the rectifying column. The characteristics of the product being formed can be determined at any time by an observation of the temperature of the material passing from the kettle to the rectifying column, and of the pressure at which the gaseous product of the rectifying column leaves the apparatus.

In the rectifying column, the wild mixture is separated into a vaporous fraction, and a liquid fraction which constitutes the final product, and the separation is so made that not more than one hydrocarbon individual occurs in substantial quantity in both fractions.

For a maximum yield of marketable gasoline, the material may be separated so that substantially all the butane enters the liquid while all more volatile hydrocarbons are boiled off. Of course, some of the butane may be removed from the liquid with the propane and other relatively volatile hydrocarbons, and a less volatile final product will result. It will usually be impossible to incorporate into the final product a substantial quantity of a hydrocarbon more volatile than butane, assuming that the product is to be transported and used as natural gas gasoline now is. The sum of the effects of the large quantity of butane and of the more volatile hydrocarbon would be too large to permit the material to pass any usual vapor-pressure specifications.

By excluding all hydrocarbons more volatile than butane from the final product, its vapor pressure will sometimes remain within permissible limits when all the butane in the gas treated is caused to enter the gasoline. That is to say, the gasoline produced is such cases is of acceptable quality, and a maximum yield is obtained, when all the butane of the gas is incorporated into the gasoline. Full advantage may therefore be taken of the high activity of the absorbent, since the rectification treatment affords a means, not heretofore available, of selectively and quantitatively removing the hydrocarbons more volatile than butane.

Many of the natural gases now used for the recovery of gasoline contain a percentage by weight of butane which is larger than the combined weight-percentages of all hydrocarbons of higher molecular weight than butane. If all the butane and less volatile substances contained in such gases are incorporated into the final product, a gasoline containing upward of 50% butane will result. Nevertheless, due to complete absence of substances more volatile than butane, the vapor pressure will often be sufficiently low for a marketable gasoline.

I have been able to produce gasolines containing upward of 25% of butane, and even upward of 40%, which were free from propane and all more volatile hydrocarbons, and which showed much lower vapor pressures than any gasolines of comparable butane content heretofore produced. The vapor pressure of many of these propane-free gasolines did not substantially exceed 18 pounds at 100° F. Regardless of its vapor pressure, a gasoline containing upward of 25% of butane and free from propane and more volatile hydrocarbons is a new composition so far as I am aware.

In a particular instance, a gasoline produced in accordance with my invention contained 46.2% butane, the balance being pentane and less volatile hydrocarbons, with hydrocarbons more volatile than butane absent. Despite this high butane content, the vapor pressure of the product was only 13 pounds per square inch at 100° F.

It will be seen that by combining the rectification steps with the solid-absorbent process, the entire butane content of a natural gas can often be incorporated into gasoline made therefrom without imparting an excessive vapor pressure to such gasoline, while if a product containing substances more volatile than butane, or containing only a part of the butane, and no more volatile substances is desired, the combined process will produce the maximum quantity of such liquid of any given vapor pressure, or a minimum vapor pressure for any given yield of liquid. In this latter case, modification of the final product is accomplished through control of the rectification, the rest of the process following without modification or interruption the lines on which it attains its maximum efficiency.

I claim:—

1. As a new product, propane-free natural gas gasoline, containing upward of 25% of butane.

2. As a new product, natural gas gasoline containing upward of 25% of butane and having a vapor pressure not substantially in excess of 18 pounds per square inch at 100° F.

3. As a new product, natural gas gasoline containing upward of 25% of butane and free from more volatile hydrocarbons.

4. As a new product, natural gas gasoline containing upward of 25% of butane and free from more volatile hydrocarbons, and having a vapor pressure not substantially in excess of 18 pounds per square inch at 100° F.

5. As a new product, natural gas gasoline containing upward of 40% of butane and free from more volatile hydrocarbons.

6. As a new product, natural gas gasoline containing upward of 40% of butane and having a vapor pressure not substantially in excess of 18 pounds per square inch at 100° F.

In testimony whereof, I affix my signature.

HAROLD E. THOMPSON.